Sept. 25, 1945.  L. A. McNABB  2,385,526
HEAT SHIELD FOR INCANDESCENT LAMPS
Filed Oct. 29, 1942  2 Sheets-Sheet 1
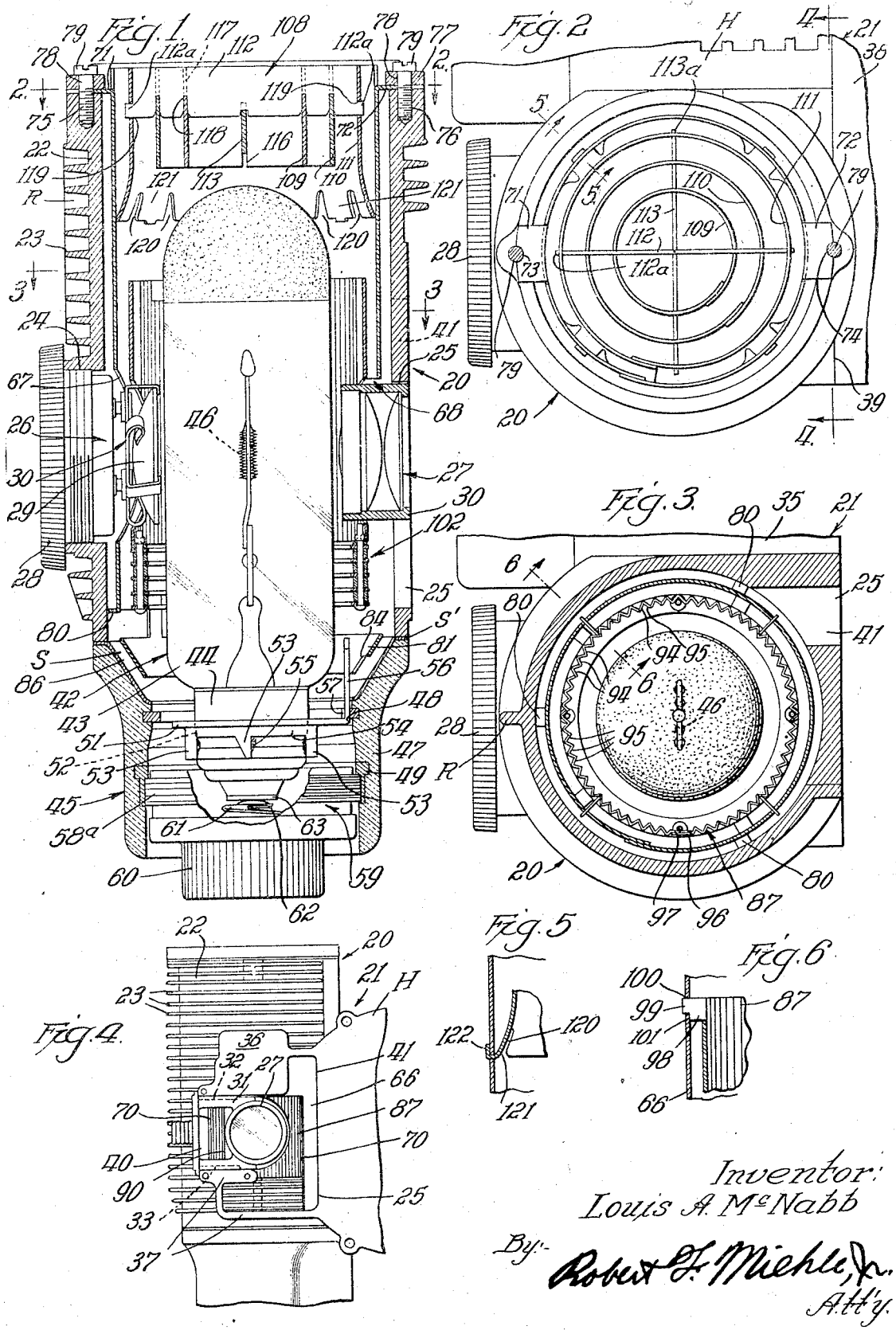
Inventor:
Louis A. McNabb
By Robert F. Miehle, Jr.
Att'y

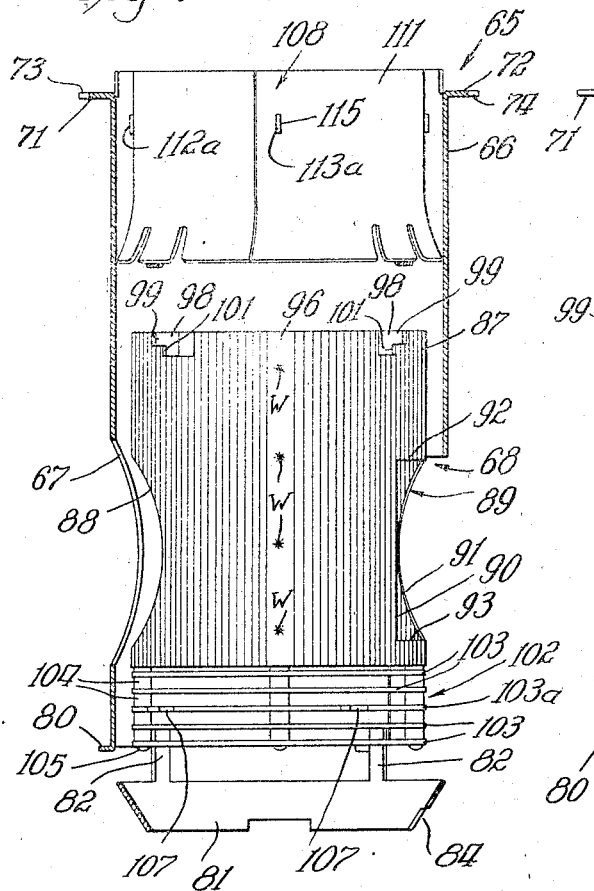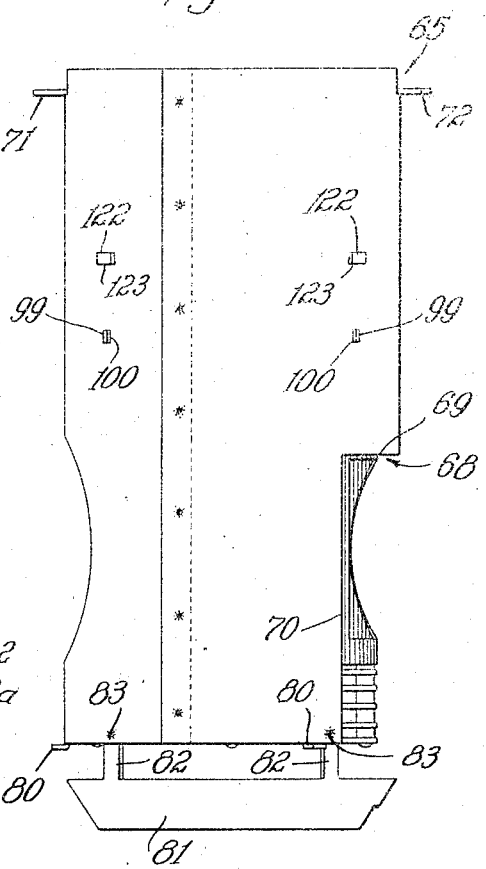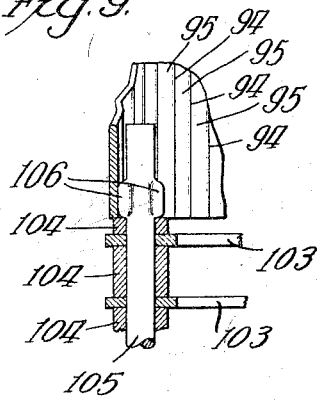

Patented Sept. 25, 1945

2,385,526

UNITED STATES PATENT OFFICE 2,385,526

HEAT SHIELD FOR INCANDESCENT LAMPS

Louis A. McNabb, Glenview, Ill., assignor to The Bell & Howell Company, Chicago, Ill., a corporation of Illinois Application October 29, 1942, Serial No. 463,845

2 Claims. (Cl. 240—47)

My invention relates to a heat shield device of a character especially suitable for use about relative small high wattage lamps as in motion picture projectors, although not restricted to this field of use.

The general object of this invention is the provision of an improved heat shield device embodying a novel lamp-shrouding structure which is highly absorbent of heat radiated from the incandescent filament of an enclosed lamp and which defines passages for the guidance of an air stream to conduct away the absorbed and radiated heat.

A further object is the provision of a device according to the preceding object, economically fabricated into a unit conveniently insertable into the ventilated lamp chamber of a light beam projecting apparatus.

With these objects in view my invention consists in certain features of novelty in the construction, combination, and arrangement of parts by which the said objects and other objects, hereinafter appearing, are effected all as fully described with reference to the accompanying drawings, and more particularly pointed out in the appended claims.

In the drawings:

Fig. 1 is a vertical sectional view taken centrally through the lamp chamber portion of a motion picture projector housing and likewise through a preferred embodiment of the invention installed therein;

Fig. 2 is a plan view of the heat shield device shown in Fig. 1, there being also shown a fragmentary portion of the projector housing, the view being taken as indicated on the line 2—2 of Fig. 1;

Fig. 3 is a horizontal sectional view taken on the line 3—3 of Fig. 1;

Fig. 4 is a fragmentary front elevational view of the lamp chamber, illustrating flat surface areas for facilitating the assembly therewith of film-advancing mechanism and a ventilating fan casing, the view being taken on the line 4—4 of Fig. 2;

Fig. 5 is a fragmentary vertical sectional view of a portion of the heat shield structure, taken on the line 5—5 of Fig. 2;

Fig. 6 is a fragmentary vertical sectional view of a different portion of the heat shield structure, taken on the line 6—6 of Fig. 3;

Fig. 7 is a view taken in elevation of the entire heat shield structure, with the outer shell thereof shown in section to expose interior parts in side elevation;

Fig. 8 is a side elevational view of the entire heat shield structure;

Fig. 9 is an enlarged fragmentary view illustrating fastening means for fabricating heat shield rings onto the lower end of the inner shell of the heat shield structure; and Fig. 10 is a plan view of one of said rings which has centering studs spaced circumferentially about its outer periphery.

With continued reference to the drawings, and particularly to Figs. 1 to 4, there will be seen a lamp chamber 20 comprising but part of a motion picture projector housing 21. This lamp chamber has a substantially cylindrical upright side wall 22 circumscribed exteriorly by axially-spaced cooling fins 23 distributed along its entire length and reinforced by any desired number of vertical ribs R of which one is shown in Figs. 1 and 3. Said chamber is open at both its top and bottom ends. Diametrically opposite openings 24 and 25 respectively in the back and front of the chamber side wall are for the accommodation of a light reflector unit 26 and a light condensing lens unit 27.

The reflector unit includes a plug 28 of which a threaded portion is meshable with threads within the opening 24 whereby this plug and a reflector member 29 attached thereto by a frame 30 are removably associated with the lamp chamber.

The lens unit 27, as noted in Fig. 4, is mounted in a frame 31 which is slidably carried upon horizontal vertically spaced guideways 32 and 33, making possible lateral removal and insertion of the lens unit.

An electric motor housing H, cast integrally with the lamp chamber 20, presents its front end in a common plane with front flat surface areas 36 and 37 bordering the upper and lower sides of the generally rectangular chamber opening 25, so that a fan housing 38, Fig. 2, and an air passage (not shown) leading therefrom can be conveniently assembled in communicative relation with and sealed relation about said chamber opening. In Fig. 4 it can be seen that the front face of the lens-carrying frame is flat to enable it to have a sealing sliding fit with a contiguous back face portion 39, Fig. 2, of the fan housing 38 so the seal between said housing and the lamp chamber about the opening 25 does not interfere with movement of said frame. Also it will be noted that the frame 31 has a rectangular opening 40 within the opening 25 and through which a portion of the air can pass from the fan housing 38 into the lamp chamber, that part of the opening 25 below and to the right, Fig. 4, of the lens unit 27 conducting the greater part of the air into the lamp chamber. An upwardly projecting portion 41 of the opening 25 is shown in Figs. 3 and 4.

A relatively small high wattage lamp 42 having a glass envelope 43 and a base portion 44 is supported by the latter upon and within a current-supplying socket structure 45 at such an elevation that the incandescent filament 46 is disposed coaxially with the reflector 29 and the condensing lens unit 27. This lamp socket structure comprises a cylindrical insulator shell 47 arranged coaxially with and below the lamp chamber. Such shell is smaller in diameter than the lamp chamber excepting for a flared portion at its upper end which is securely fastened to the lamp chamber by any standard means (not shown). Both ends of the socket shell 47 are open.

Two current conductor rings 48 and 49 are embedded in the shell 47. Means (not shown) is adapted to connect these rings with respective leads from an electrical energy source. Ring 48 protrudes radially inwardly from the inner periphery of the shell so it is engageable by and can serve as an axial abutment for an electrical conductor annulus 51. A hole 52 in the annulus receives the lamp base while lugs 53 upon a downturned cylindrical flange 54 about this hole are solder-connected as at 55 to the lamp base to establish a good electrical connection therewith and to prevent relative movement between these parts both axially and rotatively. The annulus 51 has a lug 56 bent upwardly from its outer edge. Therefore, when this annulus 51 abuts the ring 48 the lamp will be at the proper height to align its filament with the reflector 29 and with the lens unit 27, and when said upturned lug 56 is engaged in a notch 57 therefor in the ring 48 the lamp will be angularly positioned with the plane of the filament 46 thereof normal to the common axis of the reflector 29 and the condensing lens unit 27.

The inner periphery of the conductor ring 49 is threaded for receiving the threaded portion 58a of a closure plug 59 for the bottom of the shell 47. A milled finger grip portion 60 of this plug facilitates engagement thereof for screwing the same into the ring 49. The threaded portion 58a of the plug 59 is of metal or other electrical conductor material and is connected electrically by means (not shown) with a spring contact member 61 anchored within the plug and having a contact button 62 arranged coaxially therewith for pressing against the central electrode member 63 of the lamp. Thus it will be seen that when the plug 59 is screwed into the ring 49 the spring 61 and the button 63 thereon, in addition to making electrical contact with the electrode 59, will also be effective for pressing the lamp upwardly to its limit determined by abutment of the annulus 51 with the ring 48.

Sufficient clearance is provided by the lamp chamber radially of the lamp to provide ample space for the heat shield assembly now to be described. This assembly which is of a unitary structure as shown in Figs. 7 and 8 is generally designated 65. Such assembly consists of a plurality of coaxial circular parts of which some are sleeve-like and concentric. An outer cylindrical tubular member 66 of the unit 65 is formed of metal so that it will be capable of withstanding the heat from the lamp without deterioration and furthermore so that it will be a relatively good conductor of heat. Likewise the other parts of the unit 65 are also made of metal. A generally circular hole 67 is formed in the back wall of the tubular member 66 whereas a straight edged notch 68 is formed in the lower front wall of said member, this notch having an upper edge 69 extending perpendicularly to the axial elements of the tubular member and straight vertical edges as 70 extending from the ends of the edge 69 and downwardly to the lower end of said member. In Fig. 1 it will be seen that the back wall opening 67 is for accommodating the reflector member 29 and that the opening 68 is for accommodating the lens unit 27. Two diametrically opposite ears 71 and 72 are cut from the upper end of the tube 66 and bent perpendicularly to the tube side walls. These ears 71 and 72 are provided with end notches 73 and 74 for registering with threaded recesses 75 and 76 within the upper end of the lamp chamber 20. Prior to assembly of the reflector unit 26 and of the lens unit 27 with the lamp chamber 20 the heat shield unit 65 will be inserted downwardly into the chamber, bringing the notches 73 and 74 into the aforesaid registry with the threaded recesses 75 and 76, the ears 71 and 72 then resting upon the upper end of the lamp chamber for supporting the heat shield unit. Subsequently a ring 77 is laid in place above the chamber wall and onto the ears 71 and 72, thereby bringing holes 78 of the ring into registry with the threaded recesses 75 and 76 so that machine screws 79 can be inserted through these holes and rotated into threaded relation with the recesses 75 and 76 as illustrated in Fig. 1 for fixing the ring and the heat shield device in assembly with the lamp chamber. It will also be seen that the ears 71 and 72 together with the machine screws 79 provide means for centering the upper end of the shield unit in the lamp chamber, and the lower end of the unit is centered in said chamber by a plurality of circumferentially spaced tab-like parts 80 formed integrally with the lower end of the tubular member 66 and projecting radially outwardly therefrom. These members 80 engage the inner periphery of the lamp chamber as illustrated in Figs. 1 and 3.

A frusto conical member 81 depends from the lower end of the tube 66 by means of four integral lugs 82 projecting upwardly from circumferentially spaced positions about its upper edge and into contact with respective inner peripheral portions of said tube. A firm connection between the lugs 82 and the tube 66 may be effected by spot welding as indicated at 83 in Fig. 8. A notch 84 is formed in the lower edge of the member 81 and provides clearance for the lug 56, Fig. 1, which is electrically connected with the source of electrical energy for energizing the lamp. Displacement of the member 81 axially from the tube 66 is so chosen that a space S will obtain between this member 81 and a heat conducting liner 86 within the flared upper end of the shell 47. This construction provides for the circulation of air downwardly into the shell 47 for keeping the base of the lamp at an operating temperature lower than would exist if such ventilation were not provided, thereby preventing deterioration of the lamp base.

A second tubular member, 87, also cylindrical, is disposed within the tubular member 66. This member 87 is shorter than the member 66 but is so arranged axially thereof that openings 88 and 89 within the back and front walls thereof register with the openings 67 and 68 of the outer tubular member 66. The back wall opennig 88 is circular and of a diameter for receiving the reflector member 29 as illustrated in Fig. 1, whereas the opening 89 has one vertical straight edge 90, a curved opposed and generally vertical edge 91 and two horizontal upper and lower edges 92 and 93; see Figs. 7 and 8. This opening 89 receives the inner end of the lens unit 27. A series of vertically extending light reflecting facets 94 and 95, best shown in Figs. 3 and 9, are formed upon the inner periphery of the tube 87. In the present structure these facets are formed by corrugating the metal sheet from which the sleeve 87 is fabricated with the corrugations thereof extending longitudinally of the sleeve to provide the sleeve with internal and external longitudinally extending fluted surfaces, opposite edge portions 96 and 97 of the sheet being overlapped and welded together at points W, Fig. 7, in the fabrication of the tube. Support of the tube 87 centrally within the tube 66 is accomplished in part by lugs 98 which are struck radially outwardly from circumferentially spaced upper end portions of the tube 87. Each of these lugs includes a narrow end portion 99 which projects through a respective hole 100 therefor in the tube 66. Shoulders 101 on the lugs 98 are adapted to abut against the inner periphery of the tube 66 for holding the tube 87 centered with respect to said tube 66 while the narrow end portions 99 prevent relative axial displacement of the tubes 66 and 87. This detail is shown in Fig. 6.

The inner tubular member 87 is designed for absorbing the heat radiated from the lamp filament 46 and for having the heat thus absorbed conducted away therefrom by an air current directed into the lamp chamber through the opening 25 and passed upwardly through the chamber. In Fig. 1 it will be noted that the plaited or faceted tube 87 registers with the filament 46 at a portion of said tubular member generally midway between its ends. Most of the heat radiated from the filament 46 emanates radially of the lamp and therefore strikes the tube 87, and because of the angular arrangement of the facets 94 and 95 with respect to these radially directed rays, said rays will not be reflected directly back toward the lamp but instead will be deflected toward the facet 94 or 95 opposite to the facet 95 or 94 to that first struck by any direct ray. As a consequence the direct rays from the filament are more efficiently absorbed by the tube 87, the heat reflected back to the lamp being practically only by re-reflection with resulting minimization thereof. Moreover the formation of the facets 94 and 95 by corrugating the tube wall provides more material in this wall which correspondingly increases its heat absorption capacity, and the external fluted surface formation of the tube resulting from corrugating the tube wall provides a plurality of different external surfaces respectively disposed to form an extended external radiating surface formation. Heat absorbed by this tube wall is conducted away from it at both its inner and outer peripheries by the aforesaid air stream passing upwardly through the lamp chamber.

While most of the heat radiating from the filament 46 is directed radially of the lamp, some of the heat will radiate downwardly into that area exteriorly of the envelope 43 adjacently below the tube 87. If this downwardly and outwardly radiated heat should strike the vertical plaited wall 87, part of it would be deflected radially inwardly and downwardly from the point of impingement with the tube inner periphery, causing this deflected heat to impinge upon the inner and upper side of the lamp base wherefore overheating thereof would be likely. Therefore instead of continuing the plaited walls of the tube 87 more distantly downwardly than illustrated in Fig. 1, a grid arrangement 102 consisting of a plurality of flat rings 103 and a ring 103a fabricated in axially spaced relation by means of spacer sleeves 104 upon headed pins 105 spaced circumferentially thereof, is attached to the lower end of the tube. These rings 103 and 103a have substantially the same outside diameter as the tube 87 and such grid arrangement is attached to the lower end of the tube by either a soldered or welded connection (not shown) between the tube and upper end portions of the pins 105 which are inserted impingedly thereagainst. Slippage of the rings 103 and 103a and their spacer sleeves from the unheaded shanks of the pins 105 is precluded by swaging the pin shanks as indicated at 106 in Fig. 9. The only difference between the rings 103 and the ring 103a is that the latter has a number of circumferentially spaced lugs 107, Figs. 7 and 10, for engaging the inner periphery of the outer tube 66 for cooperating with the shoulders 101 on the lugs 98, Figs. 6 and 7, for maintaining the axial alignment of the tube 87 and of the grid structure 102 with the outer tube 66.

Now upon referring to Fig. 1 it can be seen that heat radiated downwardly and outwardly from the filament 46 into the circular zone occupied by the grid structure 102 will for the most part impinge upon the upper flat faces of the rings 103 and 103a, and since the angle of reflection of this radiated heat is equal to the angle of incidence, the heat reflected from these upper flat surfaces of the rings 103 and 103a will be in a direction radially outwardly and upwardly from the rings into the annular space between the grid structure and the outer tube 66. Likewise heat radiated from the filament 46 downwardly into impingement with the lower portion of the tube 87 and which is not absorbed by that tube will be deflected downwardly and generally diametrically across the tube into the grid structure, and that part of these deflected rays striking the flat upper surfaces of the grid rings 103 and 103a will be again deflected, into said annular space between the grid structure and the outer tube 66.

Radiant heat emanating from the filament 46 and finding its way axially downwardly of the tube more distantly than the grid structure 102 will impinge upon the frusto conical member 81 which will diffuse these heat rays, deflecting most of them striking any inner peripheral portion thereof generally diametrically oppositely from such portion and upwardly into that annular zone of the lamp chamber between the grid structure 102 and the upper end of the frusto conical member 81. This will be a relatively small portion of the radiant heat generated in the lamp filament and when absorbed by the chamber walls is readily dissipated therefrom both exteriorly and by the air current directed upwardly through the chamber. Such heat as reaches the upper interior portion of the shell 47 by radiation and convection will be mostly absorbed by the metal liner 86 and conducted by this liner to the metal side wall of the lamp chamber against the lower end of which a radially flanged portion S' of the liner is clamped in heat conducting relation.

Thus it will be seen that the grid structure 102, the frusto conical member 81 and the metal liner 86 all perform functions of heat reflection, absorption and conduction for dissipating the heat emanating in their direction from the filament 46 to preclude that heat reaching the lamp base.

A guard and light shield structure 108 is fitted into the upper end of the sleeve 66 spacedly above the inner sleeve 87. This grid structure 108 comprises three concentric cylindrical members 109, 110 and 111 of such graduated diameter that annular spaces are provided therebetween. Two cross plates 112 and 113 arranged in respective vertical planes intersecting at right angles are interfabricated with the cylindrical members 109, 110 and 111 for holding them in assembly. The lowermost cross plate 113 has end projections 113a similar to those indicated at 112a at the opposite ends of the cross plate 112 excepting that the projections at the ends of the plate 113 are adjacently to its upper edge whereas the projections at the ends of the plate 112 are adjacently to its lower edge, and in assembling this grid member these end projections of the plates 112 and 113 are inserted into respective holes 115 disposed diametrically oppositely in the outer cylindrical member 111, see Fig. 7. In the assembly of the cylindrical members 109 and 110 with the cross plates 112 and 113 diametrically opposite notches 116 in these cylindrical members engage downwardly about the cross plate 113 and diametrically opposite notches 117 of these cylindrical members engage upwardly about diametrically opposite notched portions 118 of the cross plate 112.

It will be observed that the lower end of the outer cylindrical member 111 of the guard and light shield assembly 108 is flared and that circumferentially spaced and paired notches 120 are formed in this flared portion of the sleeve communicatively with its lower edge to define respectively associated bosses 121 therebetween. Each of these bosses is formed with a bendable tongue 122. When the grid structure 108 is inserted axially into the tube 66, flared end of the outer sleeve 111 foremost, the tongues 122 will be respectively circumferentially aligned with holes 123 in the tube 66 so that upon these tongues arriving in axial registry with said holes 123 they can be thrust outwardly therethrough and bent upwardly as illustrated in Figs. 5 and 8. This operation completes the assembly of the heat shield device.

It is after this complete assembly of the heat shield unit as shown in Figs. 7 and 8 that such unit is slid downwardly into the lamp chamber preparatory to the securement thereto by the ring 77 and screws 79 as explained hereinabove, and, obviously, this insertion of the unit into the lamp chamber is done prior to assembly of the reflector unit 26 and the lens unit 27 with said chamber so the latter units will not obstruct downward movement of the shield unit into said chamber.

In the operation of the device, air is forced into the lamp chamber by a fan (not shown) in the housing 38 and which fan is driven by a projector operating motor in the motor housing H. This air from said fan enters the lamp chamber through the opening 25. Part of the air is circulated downwardly into the lamp socket or shell 47 about the lamp base 44 to conduct heat therefrom and from the annulus member 51, the liner 86 and the frusto conical member 81. Part of the air is directed between the grille rings 103 and 103a to conduct heat from the grille 102. One component of the air stream passes upwardly between the lamp envelope 43 and the corrugated tube 87 while another component passes upwardly between said tube 87 and the tube 66 and still a third component passes upwardly between the tube 66 and the lamp chamber side walls since the ears 71 and 72 at the top of the tube 66 do not obstruct the annular space between such tube and said chamber wall. Therefore the air which absorbs heat from the various heat-absorbing parts within the lamp chamber is elevated from the lamp base and ultimately discharged through the guard and light shield structure 108 wherefore said base is subjected to a relatively cool portion of the air stream.

Much of the radiant heat absorbed by the corrugated tubular member, in the very effective manner hereinabove explained, is conducted outwardly through the upper end opening of the casing by the air stream components passing upwardly along its inner and outer peripheries, and because of the shielding effect of the outer tube 66 and the air stream component between it and the lamp chamber wall the latter will not exceed a temperature at which it can be touched with the unprotected hands of an operator without discomfort.

While I have thus described my invention, I do not wish to be limited to the precise details described, as changes may be readily made without departing from the spirit of my invention, but having thus described my invention, I claim as new and desire to secure by Letters Patent the following:

1. A generally tubular heat absorbing and dissipating shield for spacedly enclosing an incandescent electric lamp in generally coaxial relation therewith and having a portion including the lamp filament opposing region thereof of plaited form providing internal and external longitudinally extending fluted surface formations of which the internal surface formation provides a plurality of different surfaces extending longitudinally of the lamp and respectively disposed at acute angles to heat rays impinging thereon from the lamp filament to reflect the unabsorbed portion of these heat rays in paths not traversing the lamp and on to others of said surfaces and of which the external surface formation provides an extended heat radiating surface formation, and having a second portion adjoining the lamp base adjacent end of said first mentioned portion and comprising a plurality of air passage providing slats spaced longitudinally of and extending angularly about the lamp and providing surfaces facing generally in the direction of the lamp filament and disposed at acute angles to heat rays impinging thereon from the lamp filament to reflect the unabsorbed portion of these heat rays in paths radially outward from the lamp.

2. In a device of the character described, the combination of an elongated outer enclosure adapted to have an incandescent electric lamp located in central longitudinally extending relation therein and provided with air inlet and outlet openings respectively disposed for the passage of an air current through the enclosure from the region of the base of the lamp to the top of the lamp, of a generally tubular heat absorbing and dissipating shield located in and extending longitudinally of said enclosure in surrounding relation with the lamp and spacedly related with said enclosure and lamp to provide air passages interiorly and exteriorly of said heat shield, and said heat shield having a portion including the lamp filament opposing portion thereof of plaited form providing internal and external longitudinally extending fluted surface formations of which the internal surface formation provides a plurality of different surfaces extending longitudinally of the lamp and respectively disposed at acute angles to heat rays impinging thereon from the lamp filament to reflect the unabsorbed portion of these heat rays in paths not traversing the lamp and onto others of said surfaces and of which the external surface formation provides an extended heat radiating surface formation, and said heat shield having a second portion adjoining said first mentioned portion in the region of the lamp base and comprising a plurality of air passage providing slats spaced longitudinally of and extending angularly about the lamp and providing surfaces facing generally in the direction of the lamp filament and disposed at acute angles to heat rays impinging thereon from the lamp filament to reflect the unabsorbed portion of these heat rays in paths radially outward from the lamp.

LOUIS A. McNABB.